United States Patent
Musfeldt et al.

(10) Patent No.: US 9,647,903 B2
(45) Date of Patent: *May 9, 2017

(54) SYSTEMS AND METHODS FOR PROVIDING TRUSTED SERVICE MANAGEMENT SERVICES

(71) Applicant: First Data Corporation, Greenwood Village, CO (US)

(72) Inventors: Roger L. Musfeldt, Omaha, NE (US); Christopher T. Cox, Denver, CO (US); Todd R. Nuzum, Omaha, NE (US); Norbert Gerfelder, Darmstadt (DE); Brian G. Friedman, Omaha, NE (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,601

(22) Filed: Nov. 30, 2015

(65) Prior Publication Data
US 2016/0087858 A1 Mar. 24, 2016

Related U.S. Application Data

(63) Continuation of application No. 14/225,023, filed on Mar. 25, 2014, now Pat. No. 9,204,240, which is a (Continued)

(51) Int. Cl.
*H04M 3/42* (2006.01)
*H04L 12/24* (2006.01)
(Continued)

(52) U.S. Cl.
CPC ........ *H04L 41/5041* (2013.01); *G06F 21/604* (2013.01); *G06F 21/74* (2013.01); *G06F 21/77* (2013.01); *G06F 21/88* (2013.01); *H04L 41/0806* (2013.01); *H04L 41/50* (2013.01); *H04L 67/04* (2013.01); *H04L 67/2823* (2013.01); *H04L 67/34* (2013.01); *H04W 4/001* (2013.01); *H04W 4/12* (2013.01); *G06F 2221/2105* (2013.01); *G06F 2221/2115* (2013.01); *G06F 2221/2117* (2013.01); *G06F 2221/2147* (2013.01); *G06F 2221/2153* (2013.01)

(58) Field of Classification Search
CPC .......... G06F 21/74; G06F 21/77; G06F 21/88; H04L 41/0806; H04L 41/50
USPC ........................................ 455/414.1
See application file for complete search history.

(56) References Cited

U.S. PATENT DOCUMENTS

| 2007/0138302 A1* | 6/2007 | Antoniou | H04L 12/24 235/492 |
| 2007/0155361 A1* | 7/2007 | Maes | H04W 4/00 455/403 |
| 2008/0082646 A1* | 4/2008 | Shenfield | H04L 67/04 709/223 |

* cited by examiner

*Primary Examiner* — Marcos Batista
(74) *Attorney, Agent, or Firm* — Eversheds-Sutherland (US) LLP

(57) ABSTRACT

Embodiments of the invention provide systems and methods for providing trusted service management services. According to one embodiment, a system can include a processor operable to execute computer-executable instructions to: generate a message generated based on a common messaging standard; transmit the message via a common gateway and corresponding interface; receiving, via the common gateway and corresponding interface, a response generated based on the common messaging standard; and process the response based on the common messaging standard.

17 Claims, 6 Drawing Sheets

Related U.S. Application Data continuation of application No. 12/465,138, filed on May 13, 2009, now Pat. No. 8,725,122.

(51) Int. Cl.
*G06F 21/60* (2013.01)
*G06F 21/74* (2013.01)
*G06F 21/77* (2013.01)
*G06F 21/88* (2013.01)
*H04L 29/08* (2006.01)
*H04W 4/00* (2009.01)
*H04W 4/12* (2009.01)

SYSTEMS AND METHODS FOR PROVIDING TRUSTED SERVICE MANAGEMENT SERVICES

RELATED APPLICATIONS

This application claims priority to U.S. patent application Ser. No. 12/465,138, entitled "Systems and Methods for Providing Trusted Service Management Services," filed on May 13, 2009, the contents of which are incorporated by reference herein in their entirety.

FIELD OF THE INVENTION

Embodiments of the invention relate generally to mobile devices and associated systems.

BACKGROUND OF THE INVENTION

Mobile devices, such as cell phones, personal digital assistants ("PDAs"), smart phones, and other similar devices, have increasingly been utilized to provide additional functionality beyond traditional voice communications. One component of enabling the mobile devices to support these additional functionalities includes installing software applications on the mobile devices. Mobile device applications can facilitate a variety of services performed by or with the mobile devices, including payment applications (e.g., prepaid, credit, debit, etc.), loyalty or incentive applications, transportation payment, access control applications, entertainment applications, and the like. Service providers operating services associated with these applications, and thus providing the mobile device software applications, need to be able to interact with their customers regardless of the carrier network the customer uses for operating the mobile device. Accordingly, multiple service providers (e.g., card issuing banks, retailers, transit operators, etc.) need to load and manage applications (e.g., NFC-based applications, etc.) onto mobile devices supported by multiple mobile network operators.

Sharing confidential information through large numbers of individual relationships (i.e., between one service provider and one mobile network operator) is inefficient, requiring complex integration by the service providers for each mobile network operator supported, and by the mobile network operators for each service provider installing applications.

Accordingly, there exists a need for providing trusted service management functionality and integration between multiple service providers and multiple mobile network operators.

BRIEF DESCRIPTION OF THE INVENTION

Embodiments of the invention may provide systems and methods for providing trusted service management services. According to one example embodiment of the invention, a system for communicating messages is provided. The system can include at least memory including computer-executable instructions; and at least one processor in communication with the memory. The processor can be further operable to execute the computer-executable instructions to: generate a message generated based on a common messaging standard; transmit the message via a common gateway and corresponding interface; receiving, via the common gateway and corresponding interface, a response generated based on the common messaging standard; and process the response based on the common messaging standard.

According to another embodiment, a method for communicating messages is provided. The method can include: generating, by one or more computers comprising one or more processors, a message generated based on a common messaging standard; transmitting, by the one or more computers, the message via a common gateway and corresponding interface; receiving, by the one or more computers via the common gateway and corresponding interface, a response generated based on the common messaging standard; and processing, by the one or more computers, the response based on the common messaging standard Additional systems, methods, apparatuses, features, and aspects are realized through the techniques of various embodiments of the invention. Other embodiments and aspects of the invention are described in detail herein and are considered a part of the claimed invention. Other advantages and features can be understood with reference to the description and to the drawings.

DETAILED DESCRIPTION OF EMBODIMENTS OF THE INVENTION

Figure 1:
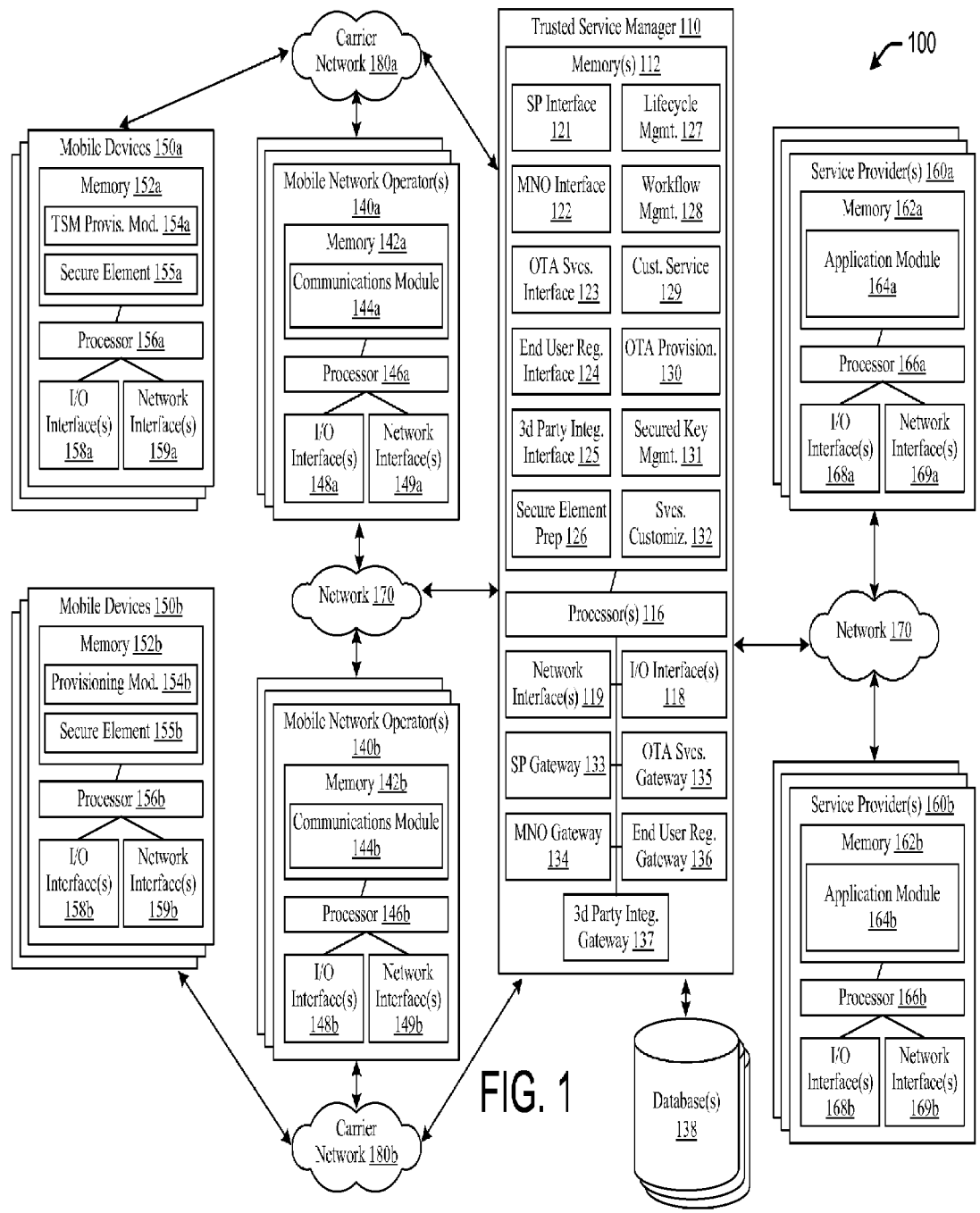
FIG. 1 illustrates a system diagram of an example trusted service management system and associated integration, according to an example embodiment of the invention.

Various embodiments of the invention are directed to providing trusted service management functionality and associated integration between multiple service providers and multiple mobile devices operating on various carrier networks, each operated by a different mobile network operator ("MNO"). According to one example embodiment, a trusted service manager ("TSM") is a third party entity strategically positioned to provide mobile device application provisioning services and integration functionality for provisioning mobile device applications and associated end-user data to end users' mobile devices, to provide mobile device application-related lifecycle management services, and to manage the many-to-many relationships between the multiple service providers and the MNOs operating the carrier networks. According to one embodiment, a TSM can facilitate provisioning and integration functionality by providing gateways and associated software interfaces for each of the integration points—a service provider gateway, a MNO gateway, and any other gateways as may be desired to provide additional integration points with other entity types. Each of the gateways and interfaces can be implemented according to a common messaging standard for the respective gateway, such that all service providers interface and communicate with the TSM according to a common service provider messaging standard, and all MNOs interface and communicate with the TSM according to a common MNO messaging standard.

Accordingly, by implementing the gateways and interfaces to communicate according to common messaging standards, the TSM provides quick, cost-effective scalability, selectability, and customization for a number of configurations, without having to reconfigure new integration points for each service provider and/or MNO added or removed, or for various other ancillary features requested by a service provider or by a MNO. Without providing the common messaging standards via the gateways and interfaces, a TSM would have to configure a new gateway according to each new integration point provided. For example, without common messaging standards, it could be envisioned that each service provider would require at least one individual gateway and associated interface, and each MNO would likewise require at least one individual gateway and associated interface. Moreover, without common messaging standards, the TSM would also be required to implement extremely complex application programming at least for each service provider and MNO combination, as well as for each additional service, feature, or function requested by service providers or MNOs. Accordingly, providing the service provider and MNO gateways, and associated interfaces implementing the common messaging standards, permits quick and flexible integration points irrespective of the number of entities integrating with the TSM. Moreover, by simplifying the application programming due to the common messaging standards, the TSM can offer a wider range of services and customization, permitting each service provider and MNO to select from a range of available service and feature combinations offered by the TSM with less effort than otherwise would be required without the common integration points.

According to various embodiments, other gateways and interfaces may include, but are not limited to, an over the air ("OTA") provisioning services gateway for interfacing either with one or more third party OTA provisioning providers and/or for directly providing OTA provisioning with mobile devices, a customer registration interface for integrating with one or more customer registration applications (which may be provided by the TSM, service providers, MNOs, and/or by another third party entity), and a third party integrator interface for integrating with other third party integration providers (e.g., other TSMs).

Applications that can be provisioned on mobile devices via a TSM can be any software application provided by a service provider and operable with a mobile device. According to one embodiment, NFC applications that enable subsequent transactions using NFC technology of the mobile device (e.g., radio frequency identification ("RFID")) are among those mobile device applications provided by service providers. However, as used herein, mobile device applications are not limited to NFC-based applications. Example mobile device applications may include, but are not limited to, open loop and closed loop payment applications (e.g., MasterCard® PayPass™, Visa payWave™, American Express® ExpressPay, Discover® ZIP, NXP Mifare®, etc.), transit payment applications, loyalty applications, membership applications, electronic promotion and incentive applications, ticketing applications, access control and security applications, entertainment applications, retail shopping applications, and the like.

In addition to providing integration and mobile device application provisioning functionality, a TSM may be further operable to provide additional features and functionality associated with each application provisioned and with each service provider, MNO, and/or mobile device end user relationship. Example additional features that a TSM may provide include, but are not limited to, application lifecycle management (e.g., load, personalize, lock, unlock, terminate, etc.), secure element lifecycle management (e.g., lock, unlock, terminate, etc.), workflow management (e.g., new handset, exchanged handset, damaged handset, lost handset, stolen handset, closed MNO account, closed service provider account, etc.), secure element data preparation and application personalization, MNO customer service, service provider customer service, OTA provisioning, secured key management, end-user authentication, MNO-based end user registration, carrier network-based end user registration, service provider-based end user registration, IVR-based end user registration, live end user registration, and the like. It is appreciated that the aforementioned additional TSM features and functionality are provided for illustrative purposes only, and that any number of features and functionality may be provided by the TSM to service providers, MNOs, and/or end users in association with the application provisioning services and functionality.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 represents a system diagram of an example system 100 for providing trusted service management functionality, according to one embodiment of the invention. As shown in FIG. 1, a trusted service manager ("TSM") computer 110; multiple mobile network operator ("MNO") computers 140a, 140b; multiple mobile devices 150a, 150b; and multiple service provider computers 160a, 160b may be in communication via at least one network 170 and/or multiple carrier networks 180a, 180b, each of the carrier networks 180a, 180b being associated with a respective MNO computer 140a, 140b. Each of these components will now be discussed in further detail.

First, the TSM computer 110 may be one or more of any processor-driven devices, such as, but not limited to, a server computer, a mainframe computer, one or more networked computers, a desktop computer, a personal computer, a laptop computer, a mobile computer, or any other processor-based device. In addition to having one or more processors 116, the TSM computer 110 may further include a memory 112, input/output ("I/O") interface(s) 118, and network interface(s) 119. The memory 112 may be any computer-readable medium, coupled to the processor(s) 116, such as RAM, ROM, and/or a removable storage device for storing data files and a database management system ("DBMS") to facilitate management of data files and other data stored in the memory 112 and/or stored in one or more separate databases 138. The memory 112 may also store various program modules, such as an operating system ("OS"), a service provider interface 121, a mobile network operator interface 122, an over the air provisioning provider interface 123, an end user registration interface 124, a third party integrator interface 125, a secure element preparation module 126, a lifecycle management module 127, a workflow management module 128, a customer service module 129, an over the air provisioning module 130, a secured key management module 131, and a customization module 132. The OS may be, but is not limited to, Microsoft Windows®, Apple OSX™, Unix, a mainframe computer operating system (e.g., IBM z/OS, MVS, OS/390, etc.), or a specially designed operating system. Each of the interfaces and modules 121, 122, 123, 124, 125, 126, 127, 128, 129, 130, 131, 132 may comprise computer-executable program instructions or software, including a dedicated program, for receiving, storing, extracting, managing, processing, and analyzing transactions associated with application provisioning and lifecycle management between multiple service provider computers 160a, 160b and multiple mobile devices 150a, 150b operating on multiple carrier networks 180a, 180b, each of which are operated by a different MNO computer 140a, 140b. The specific functions and operability of each of these interfaces and modules 121, 122, 123, 124, 125, 126, 127, 128, 129, 130, 131, 132 are further described with reference to FIGS. 2-6.

Still referring to the TSM computer 110, the I/O interface(s) 118 may facilitate communication between the processor 116 and various I/O devices, such as a keyboard, mouse, printer, microphone, speaker, monitor, bar code reader/scanner, RFID reader, Hardware Security Modules ("HSMs"), which facilitate secure key management, and the like. With respect to HSMs, an HSM may be external, such as connected to the TSM computer 110 via a network, or internally or proximately connected to the TSM computer 110. The network interface(s) 119 may take any of a number of forms, such as, but not limited to, a network interface card, a modem, a wireless network card, a cellular network card, or any other means operable for facilitating communications with one or more carrier networks 180a, 180b and/or other networks 170. Indeed, the TSM computer 110 can communicate directly with mobile devices 150a, 150b via the carrier networks 180a, 180b, respectively, via network interface(s) 119 and/or via one or more of the service provider gateway 133, mobile network operator gateway 134, over the air services gateway 135, end user registration gateway 136, and third party integrator gateway 137. It will be appreciated that the TSM computer 110 may be implemented on a particular machine, which may include a computer that is designed, customized, configured, or programmed to perform at least one or more functions of the interfaces and modules 121, 122, 123, 124, 125, 126, 127, 128, 129, 130, 131, 132, according to an example embodiment of the invention.

Second, the MNO computers 140a, 140b may be one or more of any processor-driven devices, such as, but not limited to, a server computer, a mainframe computer, one or more networked computers, a desktop computer, a personal computer, a laptop computer, a mobile computer, or any other processor-based device. In addition to having one or more processors 146a, 146b, each of the MNO computers 140a, 140b may further include a memory 142a, 142b, input/output ("I/O") interface(s) 148a, 148b, and network interface(s) 149a, 149b. The memory 142a, 142b may be any computer-readable medium, coupled to the processor(s) 146, such as RAM, ROM, and/or a removable storage device for storing data files and a DBMS to facilitate management of data files and other data stored in the memory 142a, 142b and/or stored in one or more separate databases. The memory 142a, 142b may also store various program modules, such as an operating system ("OS") and a communications module 144a, 144b. The OS may be, but is not limited to, Microsoft Windows®, Apple OSX™, Unix, a mainframe computer operating system (e.g., IBM z/OS, MVS, OS/390, etc.), or a specially designed operating system. The communications module 144a, 144b may comprise computer-executable program instructions or software, including a dedicated program, for facilitating communications with multiple mobile devices 150a, 150b operating on the respective carrier networks 180a, 180b, and for facilitating mobile device application provisioning and management via a common MNO messaging standard as implemented by the TSM computer 110.

Still referring to each MNO computer 140a, 140b, the I/O interface(s) 148a, 148b may facilitate communication between the processors 146a, 146b and various I/O devices, such as a keyboard, mouse, printer, microphone, speaker, monitor, bar code reader/scanner, RFID reader, and the like. The network interface(s) 149a, 149b may take any of a number of forms, such as, but not limited to, a network interface card, a modem, a wireless network card, a cellular network card, or any other means operable for facilitating communications with one or more carrier networks 180a, 180b and/or other network 170. It will be appreciated that the MNO computers 140a, 140b may be implemented on a particular machine, which may include a computer that is designed, customized, configured, or programmed to perform at least one or more functions of the communications module 144a, 144b, according to an example embodiment of the invention.

Third, the mobile devices 150a, 150b may be any mobile processor-driven device, such as a mobile phone, radio, pager, laptop computer, handheld computer, PDA, and the like, or any other processor-based mobile device for facilitating communications over one or more carrier networks 180a, 180b. For example, each mobile device 150a, 150b is registered with a specific MNO computer 140a, 140b for communicating via the respective carrier network 180a, 180b. In addition to having one or more processors 156a, 156b, each of the mobile devices 150a, 150b may further include a memory 152a, 152b, input/output ("I/O") interface(s) 158a, 158b, and network interface(s) 159a, 159b. The memory 152a, 152b may be any computer-readable medium, coupled to the processor(s) 156, such as RAM, ROM, and/or a removable storage device for storing data files. The memory 152a, 152b may also include secure elements 155a, 155b for maintaining mobile device applications and confidential data offered by one or more service providers 160, as may be provisioned via the TSM computer 110 and associated provisioning services. The memory 152a, 152b may also store various program modules, such as an operating system ("OS"), end user interface module(s), and a TSM provisioning module 154a, 154b (also referred to interchangeably herein as "TSM administration software"). The OS may be any mobile operating system, including proprietary operating systems by a mobile device manufacturer or mobile network operator, or third party software vendor mobile operating system, such as, but not limited to, Microsoft Windows CE®, Microsoft Windows Mobile®, Symbian OS™, Apple iPhone™ OS, RIM BlackBerry® OS, Palm OS® by ACCESS, or Google Android™. The TSM provisioning module 154a, 154b may comprise computer-executable program instructions or software, including a dedicated program, for facilitating mobile device application provisioning on secure elements 155a, 155b as carried out by the TSM computer 110. According to various embodiments, the secure elements 155a, 155b may refer to any computer-readable storage in the memory 152 and/or may refer to any securitized medium having memory, such as a Universal Integrated Circuit Card ("UICC"), Subscriber Identity Module ("SIM"), and the like. In one example, the secure elements 155a, 155b may be operable with a RFID device or other NFC device associated with the mobile devices 150a, 150b. It is also appreciated that the secure elements 155a, 155b may be a separate embedded secure element (e.g., smart card chip) or a separate element (e.g., removable memory card, a key fob; connected via Bluetooth, etc.).

Still referring to each mobile device 150a, 150b, the I/O interface(s) 158a, 158b may facilitate communication between the processors 156a, 156b and various I/O devices, such as a keypad, touch screen, keyboard, mouse, printer, microphone, speaker, screen display, RFID device, NFC device, and the like. The network interface(s) 159a, 159b may take any of a number of forms to permit wireless communications according to various communications standards, such as, but not limited to, Code Division Multiple Access ("CDMA"), Global System for Mobile Communication ("GSM"), Universal Wireless Communications ("UWC"), Universal Mobile Telecommunications System ("UMTS"), or General Packet Radio Service ("GPRS") communication standards as may be implemented by one or more carrier networks 180a, 180b. The network interfaces(s) 159a, 159b may further permit access to other networks 170, such as via one or more carrier networks 180a, 180b providing Internet or other network access, or via wi-fi communications onto a wi-fi network. It will be appreciated that the mobile devices 150a, 150b may be implemented on a particular machine, which may include a computer that is designed, customized, configured, or programmed to perform at least one or more functions of the TSM provisioning module 154a, 154b and other mobile communications, including voice communications, data communications, short message service ("SMS"), wireless application protocol ("WAP"), multimedia message service ("MMS"), Internet communications, other wireless communications, and the like, according to an example embodiment of the invention.

Fourth, the service provider ("SP") computers 160a, 160b may be one or more of any processor-driven device, such as, but not limited to, a server computer, a mainframe computer, one or more networked computers, a desktop computer, a personal computer, a laptop computer, a mobile computer, or any other processor-based device. In addition to having one or more processors 166a, 166b, each of the service provider computers 160a, 160b may further include a memory 162a, 162b, input/output ("I/O") interface(s) 168a, 168b, and network interface(s) 169a, 169b. The memory 162a, 162b may be any computer-readable medium, coupled to the processor(s) 166, such as RAM, ROM, and/or a removable storage device for storing data files and a DBMS to facilitate management of data files and other data stored in the memory 162a, 162b and/or stored in one or more separate databases. The memory 162a, 162b may also store various program modules, such as an operating system ("OS") and a mobile device application module 164a, 164b. The OS may be, but is not limited to, Microsoft Windows®, Apple OSX™, Unix, a mainframe computer operating system (e.g., IBM z/OS, MVS, OS/390, etc.), or a specially designed operating system. The mobile device application module 164a, 164b may comprise computer-executable program instructions or software, including a dedicated program, for generating and/or providing mobile device software applications for provisioning on multiple mobile devices 150a, 150b via a common service provider messaging standard as implemented by the TSM computer 110.

Still referring to each service provider computer 160a, 160b, the I/O interface(s) 168a, 168b may facilitate communication between the processors 166a, 166b and various I/O devices, such as a keyboard, mouse, printer, microphone, speaker, monitor, bar code reader/scanner, RFID reader, and the like. The network interface(s) 169a, 169b may take any of a number of forms, such as, but not limited to, a network interface card, a modem, a wireless network card, a cellular network card, or any other means operable for facilitating communications with the network 170. It will be appreciated that the service provider computer 160a, 160b may be implemented on a particular machine, which may include a computer that is designed, customized, configured, or programmed to perform at least one or more functions of the mobile device application module 164a, 164b, according to an example embodiment of the invention.

The network 170 may include any telecommunication and/or data network, whether public, private, or a combination thereof, including a local area network, a wide area network, an intranet, an internet, the Internet, intermediate hand-held data transfer devices, a publicly switched telephone network ("PSTN"), a cellular network, and/or any combination thereof and may be wired and/or wireless. The network 170 may also allow for real time, near real time, off-line, and/or batch transactions to be transmitted between or among the TSM computer 110, the MNO computer(s) 140a, 140b, the mobile devices 150a, 150b, and the service provider computers 160a, 160b. Due to network connectivity, various methodologies as described herein may be practiced in the context of distributed computing environments. It will also be appreciated that the network 170 may include a plurality of networks, each with devices such as gateways and routers for providing connectivity between or among networks 170. Instead of, or in addition to, a network 170, dedicated communication links may be used to connect the various devices in accordance with an example embodiment.

The mobile carrier networks 180a, 180b may include any cellular telecommunication network, each operated by a respective mobile network operator. The mobile carrier networks may be implemented to operate according to one or more wireless technology formats, including, but not limited to, CDMA, GSM, UWC, UMTS, GPRS, and/or any "generation" or version thereof. Accordingly, in one embodiment, each mobile device 150a, 150b is configured to operate primarily on a certain carrier network 180a, 180b as operated by the mobile network operator with which the mobile device end user has an agreement and with which the mobile device is registered. It is appreciated, however, that, according to various embodiments, mobile devices 150a, 150b and carrier networks 180a, 180b may be configured to permit interoperability of mobile devices on non-registered carrier networks 180a, 180b.

Generally, each of the memories and data storage devices, such as the memories 112, 142a, 142b, 152a, 152b, 162a, 162b and the databases 138, and/or any other memory and data storage device, can store data and information for subsequent retrieval. In this manner, the system 100 can store various received or collected information in memory or a database associated with one or more of the TSM computer (s) 110, the MNO computer(s) 140a, 140b, the mobile devices 150a, 150b, and/or the service provider computer(s) 160a, 160b. The memories and databases can be in communication with each other and/or other databases, such as a centralized database, or other types of data storage devices. When needed, data or information stored in a memory or a database may be transmitted to a centralized database capable of receiving data, information, or data records from more than one database or other data storage devices. In other embodiments, the databases shown can be integrated or distributed into any number of databases or other data storage devices.

Suitable processors, such as the processors 116, 146a, 146b, 156a, 156b, 166a, 166b, may comprise a microprocessor, an application-specific integrated circuit ("ASIC"), and/or state machine. Example processors can be those provided by Intel Corporation (Santa Clara, Calif.), AMD Corporation (Sunnyvale, Calif.), and Motorola Corporation (Schaumburg, Ill.). According to various embodiments, one or more of the computers can be configured as a multi-processor computer having multiple processors 116, 146a, 146b, 156a, 156b, 166a, 166b providing parallel and/or redundant processing capabilities. Such processors comprise, or may be in communication with, media, for example, computer-readable media, which stores instructions that, when executed by the processor, cause the processor to perform the elements described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, pen drive, CD-ROM, DVD, magnetic disk, memory chip, ROM, RAM, EPROM, EEPROM, a configured processor, all optical media, all magnetic tape or other magnetic media, or any other medium from which a computer processor can read instructions. Also, various other forms of computer-readable media may transmit or carry instructions to a computer, including a router, gateway, private or public network, or other transmission device or channel, both wired and wireless. The instructions may comprise code from any computer-programming language, including, but not limited to, assembly, C, C++, C#, Visual Basic, Java, Python, Perl, JavaScript, GPSS, LISP, SAS, Parlay, JAIN, or Open Mobile Architecture.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. In addition, the designation of system components by "a" and "b" is not intended to limit the number of possible components, but instead are provided for illustrative purposes to indicate that more than one of the respective components can be provided. Accordingly, embodiments of the invention should not be construed as being limited to any particular operating environment, system architecture, or device configuration.

Figure 2:
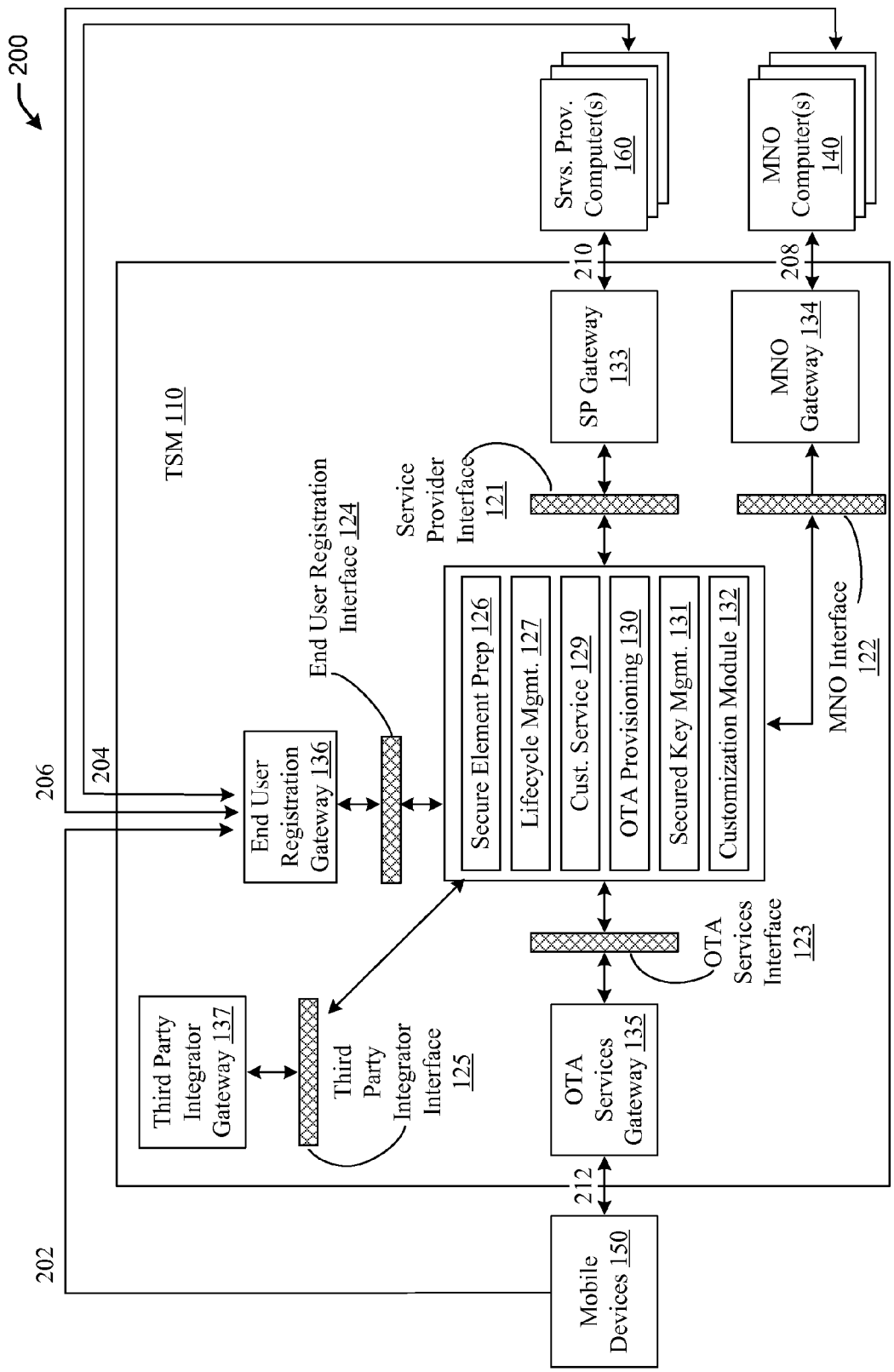
FIG. 2 illustrates a block diagram of an example trusted service management integration and associated data flow, according to an example embodiment of the invention.

FIG. 2 illustrates an example block diagram 200 illustrating data flow and integration points between the TSM computer 110 and the various other entities that may participate in mobile device application provisioning, integration, and maintenance, such as multiple service provider computers 160, multiple MNO computers 140, and multiple mobile devices 150, according to one embodiment of the invention. The operation of the block diagram 200 of FIG. 2 will be described separately and in conjunction with the flow diagrams of FIGS. 3-6.

As generally described above, a TSM and associated TSM computer 110 is operable to load, delete, and manage mobile device applications and associated end-user data on mobile devices on behalf of multiple service providers. According to various embodiments, the TSM computer 110 is operable to provide, but is not limited to, one or more of the following functions: to act as a single point of integration between service providers, MNOs, and other TSMs; to load mobile device applications over the air to mobile devices; to accept, prepare and personalize mobile device application end-user data; to allow service providers to interact with end users over one or more of the carrier networks for registration and communications; to enable a service provider to authenticate the end user requesting personalization of an application; to manage the secured keys (also referred to interchangeably herein as "cryptographic keys," "master keys," and "private keys") used for application provisioning and personalization in a secure facility, such as may be auditable to the standards required by various service provider application schemes; to manage mobile device application lifecycles on behalf of service providers over the life of an application; to manage mobile device lifecycles on behalf of MNOs over the life of a handset; and to provide billing and other administration functions to support relationships between MNOs and service providers, and between the TSM and each MNO and service provider.

Various services provided by the TSM computer 110 can be implemented by one or more of the following application modules: the secure element preparation module 126, the lifecycle management module 127, the workflow management module 128, the customer service module 129, the over the air provisioning module 130, the secured key management module 131, and the customization module 132.

The secure element preparation module 126 can be configured to facilitate preparing mobile device secure elements, such as requesting increased space allocated on the secure element for provisioning applications and verifying secure element properties with the MNO. According to various embodiments, the secure element preparation module 126 can further be configured to receive and/or provide personalization data associated with mobile device applications for each end user during provisioning. In one example, a service provider computer 160 can provide personalization data via the service provider gateway 133. As another example, the TSM computer 110 can generate personalization data via the secure element preparation module 126. As yet another example, the TSM computer 110 can coordinate application personalization and/or secure element preparation via one or more third entities.

The lifecycle management module 127 can be configured to facilitate tracking the status of users' mobile devices and the status of previously provisioned applications. For example, the lifecycle management module 127 can be configured to maintain inventories of various types of mobile devices, associated secure elements and the state of the secure elements and applications (active, locked, unlocked, terminated), which may be used to track the status of applications and mobile devices and to communicate with MNOs and/or service providers regarding the provisioned applications, the mobile devices, the end user, etc. In addition, lifecycle management module 127 can be configured to coordinate initial application requests, application personalization, secure element preparation, and provisioning; coordinate any third party entities participating in the provisioning process; maintain statuses; and facilitate billing and payment (e.g., MNO fees, service provider payment, etc.).

The workflow management module 128 can be configured to maintain and manage the workflow of events between MNOs and Service Providers. For example, when the MNO reports a lost or stolen handset to the TSM, the TSM may trigger a series of events to the Service Providers to prevent fraudulent transactions. In turn, the workflow management module, based on Service Provider rules, may instruct the lifecycle management module to send one or more commands to the mobile device to lock or terminate applications.

The customer service module 129 can be configured to receive and respond to customer service requests, including those from end users, service providers, and/or MNOs. According to one embodiment, the TSM computer 110 and associated customer service module 129 may provide triage and management functions between the various responsible entities (e.g., service providers and MNOs), and/or provide initial or more involved levels of customer service.

The over the air provisioning module 130 can be configured to facilitate the OTA provisioning of mobile device applications and associated end-user data with multiple mobile devices. As described in more detail herein, the OTA provisioning module 130 can facilitate communications with third party OTA provisioning providers via the OTA services gateway 135, and/or can facilitate direct provisioning by the TSM computer 110. It is appreciated that, according to some embodiments, the functions of the OTA provisioning module 130 can also be implemented in one or more of the MNO systems 140 and/or within functions implemented by the carrier network 180*a*, 180*b*, either instead of, or in combination with, those provided in the TSM computer via the OTA provisioning module 130.

The secured key management module 131 can be configured to provide administration and maintenance functions for secured keys (e.g., cryptographic keys, master keys, public keys, private keys, etc.) in accordance with TSM security policies, MNOs' security policies, and/or service providers' security policies. Various functions performed by the TSM computer 110 may integrate with the secured key management module 131 to provide security for end users, MNOs, and service providers in association with each of the TSM services.

The customization module 132 can be configured to facilitate customization and selection of services offered by the TSM to each service provider and MNO. As is apparent by that described and illustrated herein, the TSM computer 110 can be configured to provide a variety of features and functions associated with mobile device application provisioning and integration between the service providers and MNOs. Accordingly, due at least in part to the simplified common interfaces and gateways (e.g., MNO gateway 134 and MNO interface 122, service provider gateway 133 and service provider interface 121, etc.), the TSM computer 110 can permit each service provider and MNO to customize from the available services available. The customization module 132 can be configured to include computer-executable program logic to generate an interface for selecting and customizing TSM services, and to coordinate the implementation by other TSM application modules. For example, a first service provider may opt to only provide mobile device applications to mobile devices operating on certain carrier networks, while a second service provider may opt to provide mobile device applications to all mobile devices irrespective of the associated carrier networks. As another example, a service provider may request the TSM computer 110 to provide end user registration functionality on behalf of the service provider, while a second service provider provides its own registration services and integrates via the end user registration gateway 136 and associated end user registration interface 124. Accordingly, the customization module can permit coordinating and implementing the appropriate combination of features and integration points as requested by service providers and MNOs. It is appreciated that any combination of features and integration points can be provided by the TSM computer 110, and that these are provided for illustrative purposes only. In one implementation, the customizations provided may be driven at least in part by contractual relationships between the TSM and respective service providers and MNOs, such that the TSM may also support and/or enforce these contractual agreements as part of the customization module 132 features.

The MNOs and associated MNO computers 140 are operable to provide the communications channel to reach and provision mobile device applications and associated end-user data on end users' mobile devices. According to various embodiments, each MNO computer 140 can be operable to provide, but is not limited to, one or more of the following functions: provide the TSM computer with information on mobile device secure elements and unique mobile device identity modules (e.g., Universal Subscriber Identity Modules ("USIMs")) throughout the lifecycle; provide a communications gateway via a respective carrier network for OTA provisioning of mobile device applications; provide a mobile device user interface for accessing provisioned mobile device applications on each mobile device (e.g., a mobile wallet); facilitate management of secured keys used to securely load and delete mobile device applications on mobile device secure elements; interface with the TSM computer; facilitate authentication of the end user interfacing with the TSM; facilitate allocating memory for mobile device applications on the end users' mobile devices; communicate to the TSM computer that unique end user identity modules have changed; communicate to the TSM computer the status of unique mobile device identity modules (e.g., which USIMs have been lost, stolen, damaged, replaced by new mobile devices, etc.); and facilitate management of any tariffs and fees associated with application provisioning communications.

A MNO gateway 134 and associated MNO interface 122 are operable for providing a common point of integration between the TSM computer 110 and the multiple MNO computers 140. According to one embodiment, the mobile network operator interface 122 is configured to communicate with each MNO according to the same common MNO message standard, as described further herein. Moreover, according to various embodiments, the MNO gateway 134 and associated MNO interface 122 are further operable to permit the TSM computer 110 to communicate with mobile devices 150 via a respective carrier network operated by each MNO.

The service providers and associated service provider computers 160 are operable to provide one or more services in which mobile device end users participate (e.g., financial services, membership services, loyalty account services, etc.). Accordingly, the service providers represent the entities that generate and/or provide mobile device applications associated with these services that are provisioned via the TSM computer 110 on end users' mobile devices. A service provider generating and providing the mobile device applications may be the same service provider that operates the underlying service, or may be a service provider providing the mobile device applications on behalf of another service provider operating the underlying service. According to various embodiments, each service provider computer 160 can be operable to provide, but is not limited to, one or more of the following functions: supply a mobile device application for loading onto its end users' (e.g., customers of the service provider) mobile devices; request the use of and/or provisioning of TSM-created soft-card applications (e.g., electronic application permitting payment or other features that can used in association with participating service provider transactions); facilitate end user authentication processes and associated information; facilitate the creation and maintenance of end user application accounts (e.g., financial account if the service provider is a financial institution or payment processor, membership or loyalty account if the service provider is a retailer or other merchant, etc.); provide end user support for their provisioned mobile device applications; receive application messages from mobile devices returned via one or more of the carrier networks; facilitate processing contactless transactions associated with the provisioned mobile device applications (e.g., a payment transaction at a retailer, etc.); facilitate management and maintenance of application-related secured keys and share these keys with the TSM computer; and facilitate mobile device application personalization and/or coordinate with TSM to prepare personalization data.

A service provider gateway 133 and associated service provider interface 121 are operable for providing a common point of integration between the TSM computer 110 and the multiple service provider computers 160. According to one embodiment, the service provider interface 121 is configured to communicate with each service provider according to the same common service provider messaging standard, as described further herein.

The mobile devices 150 represent the respective end users that have contractual relationships with the MNOs (e.g., for operating on a respective carrier network) and with the service providers (e.g., for participating in one or more services offered by the service providers). Accordingly, end users can utilize the mobile devices 150 to register for, request, and activate mobile device applications from service providers via the TSM computer 110. According to various embodiments, each mobile device 150 can be operable to provide, but is not limited to, one or more of the following functions: activate mobile devices and/or secure elements with a MNO; register for and request mobile device applications from a service provider (or agent of the service provider) or from a MNO; download mobile device applications and associated end-user data on mobile device secure elements; authenticate the respective end user and/or mobile device to the service provider to permit application personalization; activate applications with the respective service providers; perform transactions using the provisioned mobile device applications (e.g., a payment transaction at a retailer, etc.); initiate customer service requests (e.g., with the respective MNO, with service providers, with the TSM, with other third party entities, etc.); notify the respective MNO of a new mobile device and/or secure element; and alter end user settings associated with provisioned mobile device applications (e.g., change or reset a PIN, cancel a mobile device application, cancel a MNO relationship, etc.).

An OTA services gateway 135 and associated OTA interface 123 are operable to facilitate provisioning of mobile device applications and associated end-user data to end users' mobile devices 150. According to one embodiment, the OTA services gateway 135 can be configured to permit the TSM computer 110 to transact with third party OTA provisioning providers to perform all or some of the OTA provisioning services with mobile devices 150, such as by utilizing a common provisioning messaging standard for all third party OTA provisioning providers in a manner similar to that described with reference to the MNO interface 122 and service provider interface 121. According to another embodiment, the OTA services gateway 135 can be configured to permit the TSM computer 110 to provision mobile device applications and associated end-user data directly to the mobile devices 150, such as via one or more carrier networks. According to various embodiments, the MNO gateway 134 and associated MNO interface 122 may be utilized at least in part to provide OTA provisioning by the TSM computer 110, such as for accessing and communicating over a respective MNO carrier network.

An end user registration gateway 136 and associated end user registration interface 124 are operable to facilitate communications with mobile device end users for registering to receive mobile device applications, requesting mobile device applications, updating status on mobile devices 150 and/or provisioned applications, and the like. According to one embodiment, service provider computers 160 and/or MNO computers 140 provide registration applications for end users (e.g., mobile device-based registration interface, Internet-based registration interface, etc.). Thus, the end user registration gateway 136 and associated end user registration interface 124 provide a common integration point and associated common messaging standard for receiving and responding to such requests in a manner similar to that described with reference to the MNO interface 122 and service provider interface 121. According to another embodiment, the TSM computer 110 can be configured to provide similar registration services to mobile device end users, such as may be performed on behalf of the service providers or MNOs. According to various embodiments, the MNO gateway 134 and associated MNO interface 122 may be utilized at least in part to provide end user registration functions by the TSM computer 110, such as for transmitting and receiving registration data over a respective MNO carrier network. According to various embodiments, the service provider gateway 133 and associated service provider interface 121 may be utilized at least in part to provide end user registration functions by the TSM computer 110, such as for end user authentication.

A third party integrator gateway 137 and associated third party integrator interface 125 are operable to facilitate communications with one or more third party integrators, such as may occur when sharing responsibilities or otherwise communicating with other TSMs. Much like that described with reference to the MNO interface 122, MNO gateway 134, service provider interface 121, and service provider gateway 133, the third party integrator gateway 137 and associated third party integrator interface 125 provide a common integration point and associated common messaging standard for communicating with any third party integrators.

Figure 3:
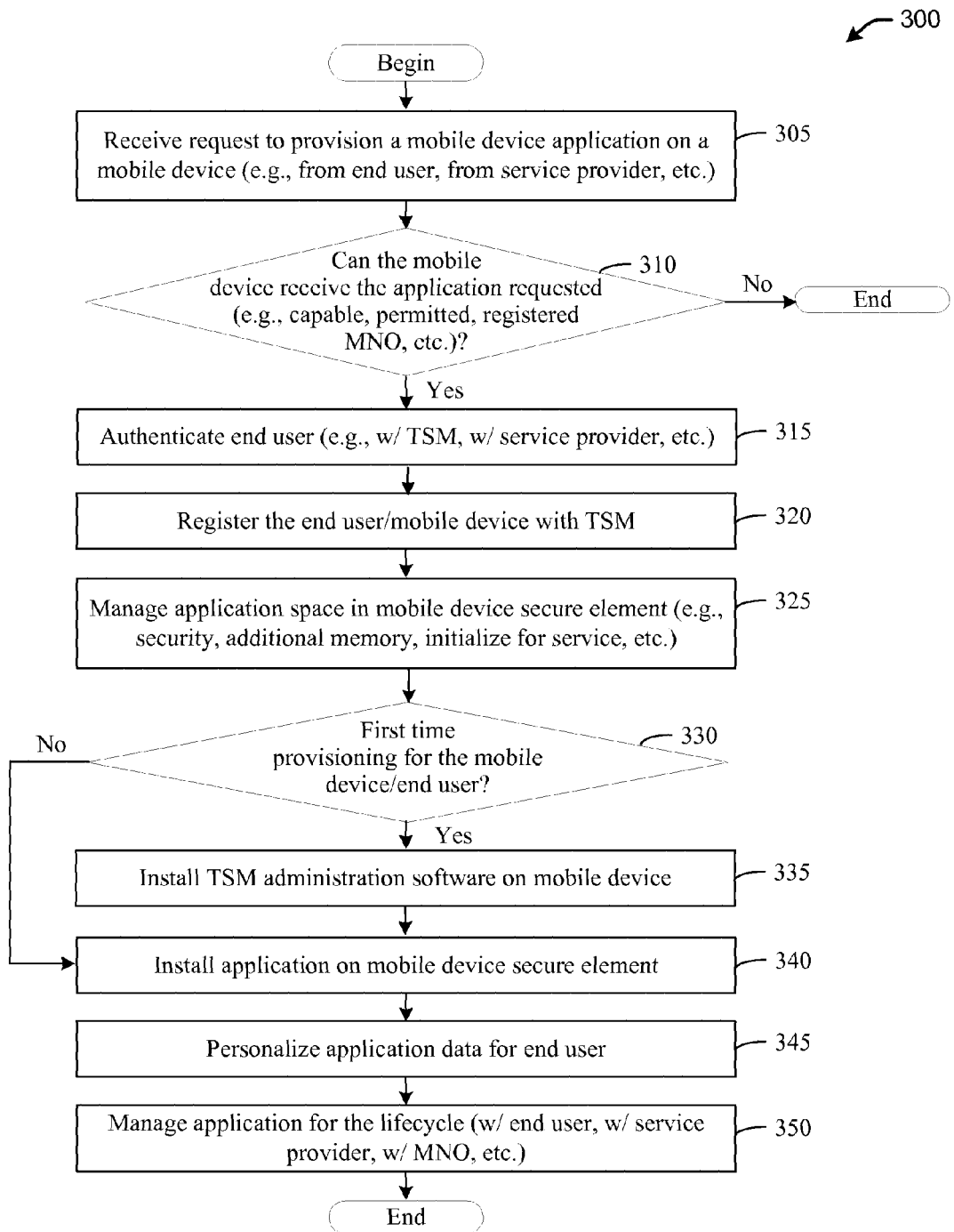
FIG. 3 illustrates a flow diagram of an example process for provisioning a mobile device application, according to an example embodiment of the invention.

With reference to FIG. 3, a flow diagram is provided illustrating an example method 300 for providing provisioning and integration services by a TSM computer 110, according to one embodiment. The method 300 is described also with reference to the block diagram 200 of FIG. 2.

By example only, the steps illustrated and described with reference to FIG. 3 can be performed to facilitate the provisioning of any mobile device application, such as a near field communication ("NFC") payment application provided by a payment service provider (e.g., card account issuer, financial institution, etc.). Thus, a mobile device user would request install of the NFC payment application on an associated mobile device from either the TSM or directly from a service provider providing the NFC payment application. The request ultimately would be transmitted to the TSM, such as via the end user registration gateway 136 and end user registration interface 124 if coming directly from the end user, or via the service provider gateway 133 and the service provider interface 121 if coming via a service provider. Upon receiving the request, the TSM computer then can verify whether the end user's mobile device is capable of receiving installs, whether a secure element associated with the end user's mobile device is adequately configured (e.g., can support an install, sufficient space, etc.). The TSM computer can then perform the necessary steps to prepare the end user's mobile device and associated secure element, either directly and/or via the end user's mobile network operator. In addition, the TSM can perform the various authentication measures that are to be performed to verify the end user, the end user's mobile device, and set up and personalize the NFC payment application for installation on the end user's secure element. After the NFC payment application is personalized and authentication and security measures are in place at the TSM computer, the NFC payment application can be provisioned to the end user's mobile device, such as via the OTA service gateway 135 and the OTA services interface 123 and/or via the MNO gateway 134 and the MNO interface 122 for interfacing with the end user's mobile network operator. After provisioning, the lifecycle of the NFC payment application for that end user can be managed via the TSM computer, such as via the lifecycle management application 127. Various services can be provided and/or otherwise facilitated by the TSM computer, such as to handle service requests from the end user, the MNO, and the service provider, to coordinate billing between the MNO and the service provider, to facilitate updates to the application, and any other communications that may be required between the MNO, the service provider, the end user's mobile device, and/or the end user. It is appreciated that this description of provisioning and servicing a NFC payment application is provided for illustrative purposes, and the methods described with reference to FIG. 3 may be performed for any type of mobile device application between any of a number of parties.

The method 300 can begin at block 305, in which the TSM computer receives a request to provision a mobile device application on a mobile device. According to various embodiments, a provisioning request can come from any of the mobile devices 150 or associated end users, service provider computers 160, the MNO computers 140, or associated websites or other network-routed requests. For example, a mobile device end user may transmit a registration request for a certain mobile device application as part of an end user communication 202, whereby the request is received via the end user registration gateway 136. In another example, a service provider registration request 204 is transmitted from a service provider to the end user registration gateway 136 according to a common service provider messaging standard, such as may occur when an end user requests an application via a service provider or when a new application version of a previously provisioned application is available. In yet another example, a MNO registration request 206 is transmitted from the MNO to the end user registration gateway 136 according to a common MNO messaging standard, such as may occur if an MNO provides application registration and request features on behalf of one or more service providers.

Following block 305 is decision block 310. At decision block 310, it is determined whether the mobile device 150 is capable and/or is permitted to receive an OTA provisioned application. For example, it can be determined whether the mobile device is technically capable of receiving an OTA provisioned application or capable of operating the specific application requested, whether enough memory is available, etc., which may be obtained from the MNO via the MNO gateway 134 via MNO communications 208. In another example, it can be determined whether the mobile device and end user are permitted to receive the application requested, such as whether the end user's contract with the MNO or the service provider permits installation and/or use of the application, which may be obtained from the MNO by MNO communications 208 sent via the MNO gateway 134 or from the service provider by service provider communications 210 sent via the service provider gateway 133, respectively. It is appreciated that any other factor may be considered when determining whether the mobile device can receive the application at decision block 310, as may be desired.

If it is determined at block 310 that the mobile device cannot receive the mobile device application requested, then the method 300 may end. According to various embodiments, the TSM computer 110 may be configured to transmit a failure or status update to the mobile device, end user, MNO, service provider, and/or any other entity or individual.

Block 315 follows block 310. At block 315, the TSM computer 110 can perform authentication processing of the end user and/or the end user's mobile device. For example, the identity of the mobile device end user can be verified as the correct end user for receiving the mobile device application and/or associated personalization data, and/or that the mobile device is in the correct end user's possession. According to one embodiment, the TSM computer 110 is operable to at least partially perform end user authentication, such as by receiving end user authentication data as part of an end user communication 202 and processing the end user authentication data against service provider provided authentication data and/or TSM stored authentication data. Though, according to other embodiments, the respective service provider can authenticate customers directly via the service provider computer 160. According to yet another embodiment, a combination of the TSM computer 110 and the service provider computer 160 may perform end user authentication, such as by receiving authentication data as part of the end user registration data 202 directly via the end user registration gateway 136, processing the authentication data in part by the TSM computer 110, and communicating authentication data and responses with the service provider computer 160 by service provider messaging 210 sent via the service provider gateway 133, according to the common service provider messaging standard. If it is determined that the end user is not authenticated, then the method 300 may terminate, or may re-attempt authentication.

If the end user is authenticated at block 315, block 320 follows. At block 320, the end user and/or the mobile device are registered with the TSM, because it was previously determined at block 310 that the mobile device and/or the user has not yet received an application via the TSM. According to various embodiments, as part of the registration process, the TSM computer 110 can be configured to store unique identifiers of the mobile device, its secure element, and/or the end users for subsequent processing. For example, according to one embodiment, the TSM computer 110 can store a Mobile Subscriber Integrated Services Digital Network Number ("MSISDN"), Integrated Circuit Card ID ("ICCID"), and/or an International Mobile Subscriber Identity ("IMSI") to uniquely identify the end user and associated mobile device. According to other embodiments, however, any unique identifier may be used, such as may be provided by the end user or by the MNO.

Following block 320 is block 325, in which the TSM computer 110 facilitates the management of the application space on the mobile device secure element. As part of this process, additional space may be provisioned via the MNO, secured keys may be provided (e.g., by the TSM or by the MNO), privileges associated with the secure element may be added or changed, and/or the mobile device may be initialized for utilizing the mobile device application (e.g., initialized for NFC transactions, etc.). It is appreciated that various other steps may be performed as part of preparing the secure element for provisioning the requested application. According to various embodiments, some or all of these steps are initiated by the TSM computer 110 but performed at least in part by a MNO computer 140 communicating directly with the mobile device (e.g., via wireless communications over the respective carrier network, via Internet-based communications, etc.). Though, according to other embodiments, the TSM computer 110 and the associated secure element preparation module 126 and/or OTA provisioning module 130 are operable to facilitate preparing and managing the application space on the mobile device secure element at block 325 via OTA communications 212 from the TSM computer 110 to the mobile device 150 via the OTA services gateway 135 (which, according to various embodiments, may also utilize the MNO gateway 134).

Following block 325 is decision block 330, in which it is determined whether the mobile device and/or end user associated with the mobile device has previously received a mobile device application via the TSM computer 110. If the TSM computer 110 has previously provisioned an application on the mobile device, then it may be assumed that the end user and/or mobile device is registered with the TSM, has TSM administration software installed, and is capable of OTA application installations. However, if the mobile device has not yet participated in OTA provisioning via the TSM computer, then additional steps may be performed to validate the capabilities and permissions to receive the application.

If it is determined at decision block 330 that the mobile device and/or the end user has not previously received a mobile device application via the TSM computer, then block 335 follows, in which the TSM computer 110 installs TSM administration software on the mobile device 150 that may be utilized to provide secured access to secure elements and further facilitate installing, accessing, and operating TSM-provisioned applications. The TSM computer 110 can install the TSM administration software on the mobile device also by OTA communications 212 sent via the OTA services gateway 135. It is appreciated that, according to another embodiment, a third party OTA provisioning provider may perform some or all of the application installation functions. In another embodiment, the MNO may generate and/or provide TSM administration software capable of accessing and operating TSM-provisioned applications. In one embodiment, the TSM administration software may be utilized to install, access, and operate all mobile device applications provided by all service providers. Though, in another embodiment, multiple administration software applications may be required, such as may occur when certain service provider applications require specialized administration software.

Following block 335 is block 340, in which the requested application can be installed on the secure element of the mobile device 150. According to one embodiment, the requested application is installed by the TSM computer 110 by communicating directly with the mobile device via the OTA services interface 123 by transmitting application data in the OTA messaging according to the standard required by the specific secure element, mobile device, and/or carrier network technology, such as via Wireless Application Protocol ("WAP"), Short Messaging Service ("SMS"), Multimedia Messaging Service ("MMS"), etc. It is appreciated that, while each of the gateways and associated interfaces described herein are designed to promote a common integration point and common messaging standards to simplify integration and system flexibility, various mobile devices and carrier networks may operate according to a number of wireless technologies, each of which may cause application provisioning processing to be performed differently according to each of the various wireless network technologies. According to another embodiment, however, instead of the TSM computer 110 provisioning the requested application, a third party OTA provisioning provider may perform some or all of the application installation functions. According to this embodiment, the OTA services gateway 135 and associated OTA services interface 123 can be configured to implement a common provisioning messaging standard for communicating with each of the possible third party OTA provisioning providers.

Following block 340 is block 345, in which personalization data associated with the requested mobile device application can be prepared and transmitted to the mobile device. According to one embodiment, personalization data can be generated by the TSM computer 110 from data supplied by the service provider computer 160 via service provider messaging 210 in the common service provider messaging format. According to other embodiments, personalization data can be created by the TSM computer 110 based on stored data, or created by a third party entity for providing personalization data. The format and content of personalization data can vary, depending on the mobile device application to be provisioned. Moreover, it is further appreciated that, according to another embodiment, the personalization application data or other associated end-user data can be transmitted at or near the same time as the application is provisioned on the mobile device at block 340.

Following block 345 is block 350, in which the TSM computer 110 is operable to manage the provisioned application during its lifetime as installed on the secure element associated with the mobile device 150. For example, as one aspect of the application installation processing occurring at block 340, the TSM computer 110 can be operable to record application installation status, including successes and failures, as may be provided by the lifecycle management module 127. The TSM computer 110 and associated lifecycle management module 127 can thus be configured to track statuses associated with the provisioned application, such as may be utilized to respond to various service provider or MNO requests, to provide periodic updates to service providers and/or MNOs, or to facilitate billing and payment functions. Application status messages can be transmitted as MNO communications 208 via the MNO gateway 134 and/or as service provider communications 210 via the service provider gateway 133, each according to the common MNO and service provider messaging standards, respectively.

In one example, in response to a request from a service provider computer 160 regarding a specific end user (e.g., as identified by name, account, or other unique identifier), the TSM computer 110 is operable to identify the end user as having a TSM-provisioned application installed. The TSM computer 110 can identify the end user by the secure element identifier (e.g., the ICCID, IMSI, etc. associated with the secure element). The mobile phone number (i.e., MSISDN) can be used as a secondary identifier of the end user. Upon identifying the end user, the TSM computer can perform one or more of, but is not limited to, the following functions when managing the application lifecycle: check the application state on an end user mobile device and/or secure element; update an application version on an end user mobile device and/or secure element; lock or unlock an application on an end user mobile device or secure element; remove an application from an end user mobile device or secure element; process a request indicating that the mobile device and/or secure element is lost or stolen; update a customer phone number and mobile device; update a secure element identity (e.g., ICCID); update an end user's authentication data; process a MNO subscriber cancellation; process a service provider end user cancellation; process application service messages; send an end user and/or mobile device MNO or service provider messages; and lock or unlock one or more of the provisioned applications.

The method 300 can end after block 350, having facilitated the provisioning of mobile device applications and integrating multiple service providers with multiple MNOs and their registered mobile devices by providing a trusted service manager that promotes simplified integration via common gateways and interfaces implementing common messaging standards.

Figure 4:
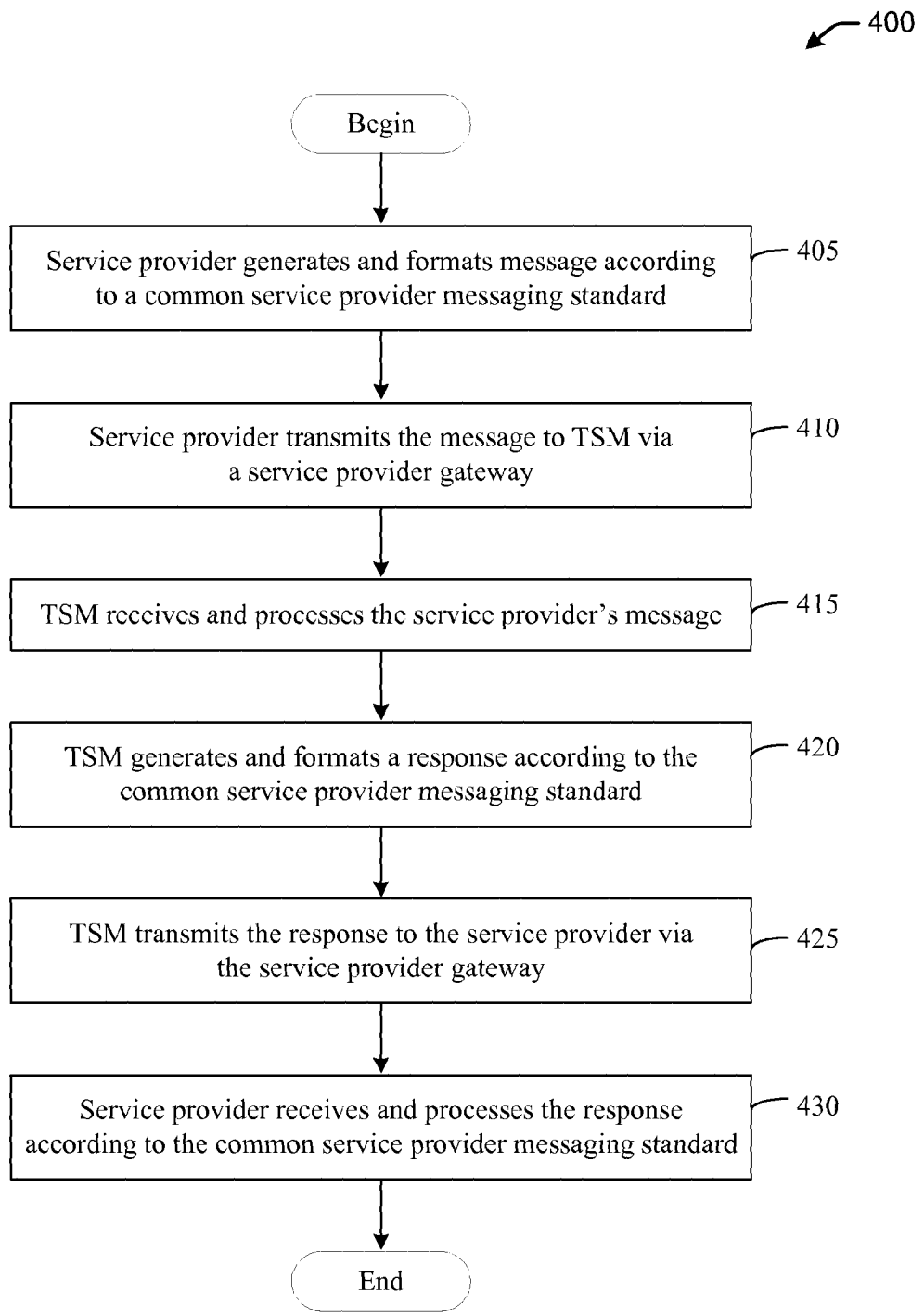
FIG. 4 illustrates a flow diagram of an example process for communicating between a service provider and a trusted service manager using a common messaging standard, according to an example embodiment of the invention.

With reference to FIG. 4, a flow diagram is provided illustrating an example method 400 for providing a common integration point and common messaging standards between a TSM computer and multiple service providers, according to one embodiment. For illustrative purposes, the method 400 provides example communication processing that can occur between one service provider computer 160 and the TSM computer 110. It is also appreciated that while FIG. 4 and the following description illustrate the a service provider originating the communications, the TSM can also originate the communications to a service provider in a similar manner. The method 400 is described also with reference to the block diagram 200 of FIG. 2.

The method 400 can begin at block 405, in which a service provider computer 160 generates a message and formats the message according to the common service provider messaging standard as may be implemented by the TSM computer 110 and associated service provider interface 121. It is appreciated that the message generated by the service provider can be any message communicated by the service provider computer 160 to the TSM computer 110, such as one or more of the features described and illustrated with reference to FIG. 2 or 3.

Following block 405 is block 410, in which the service provider computer 160 transmits the message as part of a service provider communication 210 to the service provider gateway 133 of the TSM computer 110. Accordingly, at block 415, the TSM computer 110 receives the message at the service provider gateway 133 and performs any subsequent processing on the message. Because the message is generated and formatted according to the common service provider messaging standard, the service provider interface 121 can be configured to process service provider communication 210 received from any service provider in the same or similar manner, simplifying the integration of additional service providers and processing associated transactions.

Similarly, at block 420, the TSM computer 110 can generate and format a response to the service provider message received at block 415. The TSM response can also be generated and formatted by the service provider interface 121 according to the common service provider messaging standard. As described, generating outbound messages according to a single common service provider messaging standard permits the TSM to efficiently communicate with any service provider in the same manner, without having to format communications and/or transmit communications according to different formats (e.g., as would if each service provider dictated its own messaging format). Following block 420 is block 425, in which the TSM response is transmitted to the service provider computer 160 from the service provider gateway 133 as part of a service provider communication 210.

Upon receiving the TSM response at block 430, the service provider computer 160 processes the response according to the same common service provider messaging standard.

Accordingly, the method 400 can end after block 430, having performed communications between a service provider computer and the TSM computer according to a common service provider messaging interface. It is appreciated that, while a single service provider is described with reference to FIG. 4, each service provider communicating with the TSM computer can communicate in the same or similar manner, transmitting and receiving messages according to the same service provider messaging standard.

Figure 5:
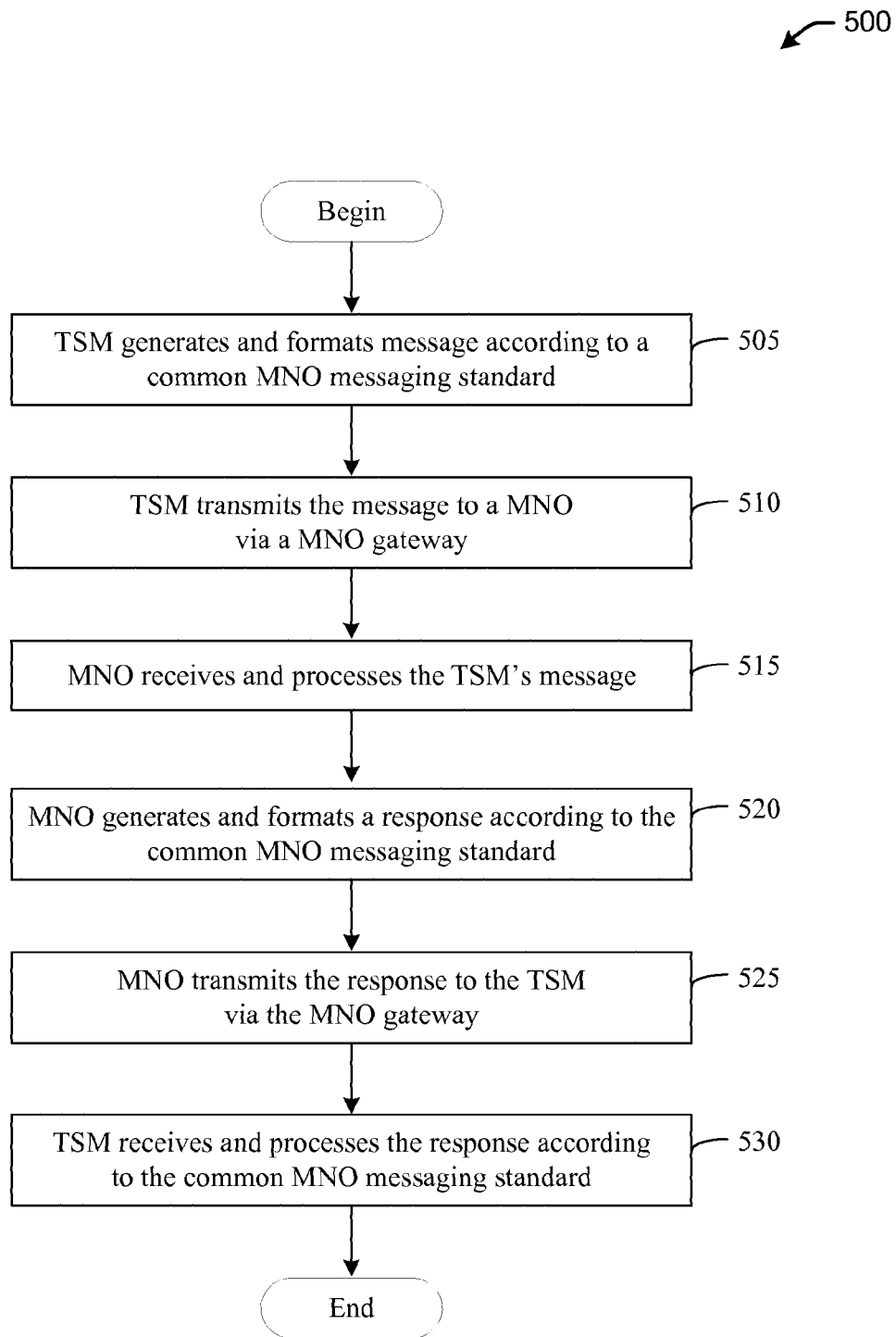
FIG. 5 illustrates a flow diagram of an example process for communicating between a mobile network operator and a trusted service manager using a common messaging standard, according to an example embodiment of the invention.

With reference to FIG. 5, a flow diagram is provided illustrating an example method 500 for providing a common integration point and common messaging standards between a TSM computer and multiple mobile network operators, according to one embodiment. In a manner similar to that described regarding service provider integration with reference to FIG. 4, the method 500 provides example communication processing that can occur between a MNO computer 140 and the TSM computer 110. The method 500 is described also with reference to the block diagram 200 of FIG. 2. It is also appreciated that while FIG. 5 and the following description illustrate the a TSM originating the communications, an MNO can also originate the communications to the TSM in a similar manner (e.g., when an MNO reports a lost or stolen mobile device to the TSM).

The method 500 can begin at block 505 in which the TSM computer 110 generates and formats a message for transmission to a MNO according to a common MNO messaging standard. Similar to that described with reference to FIG. 4, a common MNO messaging standard also enables effective and efficient integration points with multiple MNOs. For example, according to one embodiment, the MNO interface 122 is operable to facilitate generation and/or formatting of the message for transmission to the MNO computer. Following block 505 is block 510, in which the TSM computer 110 transmits the message to the MNO computer 140 via the MNO gateway 134 as part of a MNO communication 208. The message transmitted to the MNO computer 140 can be any message as may be associated with any feature or function performed in association with the TSM, such as is described with reference to FIG. 2 or 3.

The MNO computer 140 receives the message at block 515 and processes the message to extract relevant data according to the common MNO messaging standard. As a response, at block 520, the MNO computer can also generate and format a response according to the same common MNO messaging standard. The MNO response can be included as part of a MNO communication 208 from the MNO computer 140 to the TSM computer 110 via the MNO gateway 134 at block 525. At block 530, the TSM computer 110 receives the response via the MNO gateway 134 and processes the response according to the common MNO messaging standard.

Accordingly, having communicated with the MNO computer 140 according to a common MNO messaging standard, the method 500 can end after block 530. It is appreciated that, while a single MNO is described with reference to FIG. 5, each MNO communicating with the TSM computer can communicate in the same or similar manner, transmitting and receiving messages according to the same MNO messaging standard.

Moreover, while FIGS. 4 and 5 illustrate examples of transaction messaging between the TSM computer and service provider computers and MNO computers, respectively, it is appreciated that any other gateway and associated interface can be configured to operate in a similar manner with other third party entities. For example, in an embodiment in which the TSM computer 110 transacts with a third party OTA provisioning provider, provisioning communications can be transmitted and received via the OTA services gateway 135 and processed by the associated OTA services interface 123 according to a common provisioning messaging standard. In another example, in an embodiment in which the TSM computer 110 transacts with a third party integrator (e.g., another TSM system), integrator communications can be transmitted and received via the third party integrator gateway 137 and processed by the associated third party integrator interface 125 according to a common third party integrator messaging standard. According to various other embodiments, any other entities may communicate via additional gateways and interfaces in a similar manner, such that every entity of a certain type communicates according to a common messaging standard for that entity type (e.g., all third party personalization entities communicating via a common messaging standard, all third party customer service entities communicating via a common messaging standard, etc.). Moreover, according to some embodiments, one or more additional third party entities not described in detail herein may communicate via an existing gateway (e.g., via the service provider gateway 133) according to the common messaging standard implemented by that gateway and interface.

As described herein, with reference to FIGS. 2-5, the various communications transmitted between the TSM computer 110 and the service provider computers 160 and MNO computers 140 may occur on one or more networks, such as the network 170 described with reference to FIG. 1, or one or more carrier networks, such as the carrier networks 180 operated by respective MNO computers 140 described with reference to FIG. 1. According to various embodiments, the communications may be transmitted in real time or near real time or by batch or periodic processing, as desired.

While no specific messaging formats have been provided with reference to FIGS. 4-5, it is appreciated that any messaging format may be implemented, provided that the format is a common standard that may be implemented by each service provider, MNO, and the TSM. Example aspects of messaging include, but are not limited to, a header, such as can be used to identify the message type, the message content, the recipient, the sender, a packet portion or sequence, etc.; one or more body portions containing the data content of the message according to the messaging standard; and a check sum or footer, such as may be used to confirm that the message was received in full or to facilitate receipt of asynchronously transmitted packets. The common messaging standards as are implemented by the TSM computer, such as by the service provider interface 121, the MNO interface 122, etc., can define data elements and associated length, type, and placement of each element. The common messaging standards may prescribe different message formats according to the message type. Thus, as described herein, the common messaging standards can vary by implementation and are not intended to be limited to any one standard and/or message format.

Figure 6:
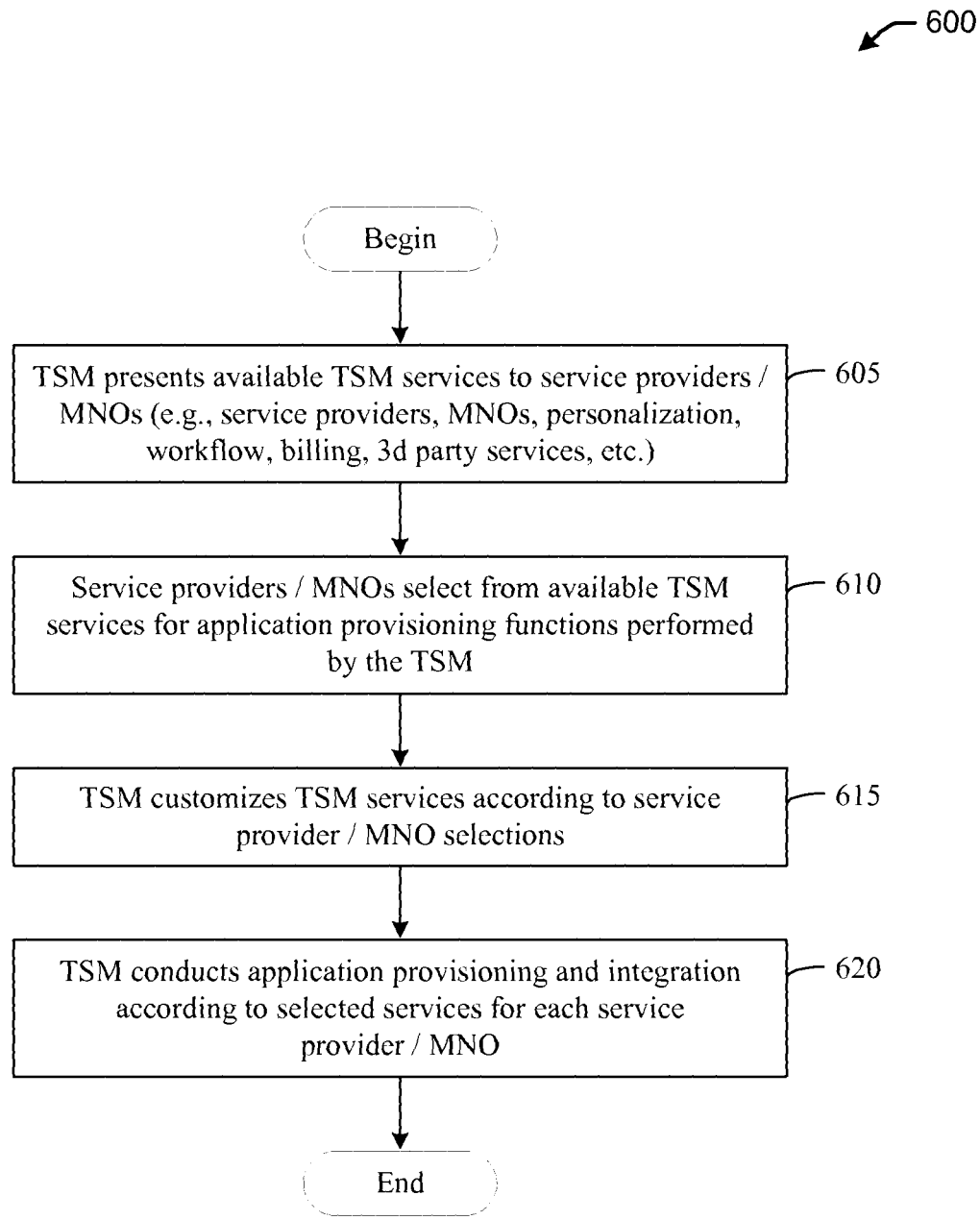
FIG. 6 illustrates a flow diagram of an example process for customizing available trusted service management services, according to an example embodiment of the invention.

With reference to FIG. 6, a flow diagram is provided illustrating an example method 600 for providing customized and selectable integration for each service provider and MNO by the TSM, according to one embodiment. The method 600 is described also with reference to the block diagram 200 of FIG. 2.

The method 600 can begin at block 605 in which the TSM presents available TSM services to each service provider and MNO in association with initiating an integration with the TSM for conducting application provisioning and supporting services. As described herein, the implementation of the various gateways and associated interfaces requiring common messaging standards for each integration point promotes simplified integration with the TSM while increasing the ease by which the TSM can offer various services and permit selectability and customization by each entity with which it integrates. Thus, according to one embodiment, the TSM computer 110 and its associated customization module 132 can generate a display or otherwise present the available TSM services to each service provider and MNO. According to other embodiments, the presentation and subsequent selection of available services may be at least partially performed manually, such as may occur when negotiating contract terms associated with the establishment of the relationship between the TSM and a service provider or MNO.

The available services can include any of the features and aspects described herein, alone or in combination, such as, but not limited to, limiting the MNOs and carrier networks over which a given service provider's applications can be installed; likewise limiting the service providers permitted to install applications over a given MNO's carrier network; selecting the TSM, one or more service providers, and/or one or more third party entities for performing personalization and secure element preparation; interfacing with additional third party integrators; selecting the TSM, one or more service providers, and/or one or more third party entities for performing user registration and application request functions; selecting the TSM or one or more third party provisioning providers for performing over the air provisioning functions; selecting the TSM, one or more service providers, one or more MNOs, and/or one or more third party entities for performing customer service functions; selecting the TSM, one or more service providers, one or more MNOs, and/or one or more third party entities for performing secured key management functions; selecting the TSM, one or more service providers, and/or one or more third party entities for performing secure element data preparation functions; requesting lifecycle management functions; requesting workflow functions; and requesting the TSM facilitate billing and payment associated with provisioning (e.g., between the MNOs and the service providers). It is appreciated that any other service associated with the TSM can be selectively customized, according to various embodiments of the invention.

Following block 605 is block 610 in which the service provider or MNO selects the desired TSM services from the available services presented at block 605. At block 615, the TSM computer 110 and associated customization module 132 can configure the TSM services for each service provider and MNO (or any other third party) according to the services selected. Having configured the integration and customized services for each service provider and MNO, the TSM computer 110 implements the integration according to the customized services at block 620, such as by performing one or more of the provisioning functions and associated services as described herein.

The method 600 can end after block 620, having implemented a customized integration between the TSM and each service provider and MNO.

Accordingly, as described herein with reference to FIGS. 1-6, embodiments of the invention provide for a trusted service management system and associated methods for mobile device application provisioning and lifecycle management. The various gateways and associated interfaces permit the TSM system to provide simplified, effective integration points between multiple service providers and multiple MNOs and associated carrier networks, due at least in part to the common messaging standards implemented for each integration point. Moreover, due to the common messaging standards and simplified integration points, the TSM can offer a wide range and combination of available services so each service provider and each MNO can select and customize the TSM services as desired without requiring unique integration mapping and application routines for each combination to implement the customized request. Accordingly, a flexible and efficient trusted service management system and associated methods are described herein.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

In certain embodiments, performing the specified functions, elements, or steps can transform an article into another state or thing. For instance, example embodiments of the invention can provide certain systems and methods that transform application provisioning requests representative of actual provisioning agreements into standardized messages representative of a provisioning request. In another example, embodiments of the invention can provide certain systems and methods that transform mobile device applications representative of actual instruments (e.g., credit card, coupon, membership card, ticket, etc.) into personalized applications operable for installing on a specific end user's mobile device representative of the actual instruments for that end user.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more computers comprising one or more processors, a first plurality of messages from a plurality of service providers, wherein at least two of the plurality of service providers utilize different messaging formats;

formatting, by the one or more computers, the first plurality of messages to a first format associated with a common service provider interface;

generating, by the one or more computers, first outbound messages based at least in part on the first format;

receiving, by the one or more computers, a second plurality of messages from a plurality of mobile network operators, wherein at least two of the plurality of mobile network operators utilize different messaging formats;

formatting, by the one or more computers, the second plurality of messages to a second format associated with a common mobile network operator interface;

generating, by the one or more computers, second outbound messages based at least in part on the second format;

receiving, by the one or more computers, a third plurality of messages from a plurality of mobile devices, wherein at least two of the plurality of mobile devices utilize different messaging formats;

formatting, by the one or more computers, the third plurality of messages to a third format associated at least with one device protocol associated with the plurality of mobile devices;
generating, by the one or more computers, third outbound messages based at least in part on the third format;
transmitting, by the one or more computers, the first outbound messages to the plurality of service providers;
transmitting, by the one or more computers, the second outbound messages to the plurality of mobile network operators;
transmitting, by the one or more computers, the third outbound messages to the plurality of mobile devices;
determining, by the one or more computers, a secured key associated with a mobile device application;
receiving, by the one or more computers, a request to provision a mobile device application from a mobile device of the plurality of mobile devices;
installing, by the one or more computers, administration software on the mobile device based at least in part on the secured key; and
provisioning, by the one or more computers, the requested mobile device application on the mobile device.

2. The computer-implemented method of claim 1, further comprising:
managing, by the one or more computers, an application space on a secure element of the mobile device.

3. The computer-implemented method of claim 2, further comprising: determining, by the one or more computers, one or more privileges associated with the secure element of the mobile device.

4. The computer-implemented method of claim 1, further comprising: receiving, by the one or more computers, from at least one of the plurality of mobile network operators the secured key.

5. The computer-implemented method of claim 1, wherein the secured key is used for at least one of personalizing of the mobile device application, managing a mobile device application lifecycle, providing administration functions to support relations between a mobile network operator and a service provider.

6. The computer-implemented method of claim 1, further comprising: facilitating, by the one or more computers, communication with at least one of the plurality of mobile devices using a carrier network operated by at least one of the mobile network operators.

7. A system comprising:
at least one memory storing computer-executable instructions; and
at least one processor, wherein the at least one processor is configured to access the at least one memory and to execute the computer-executable instructions to:
receive a first plurality of messages from a plurality of service providers, wherein at least two of the plurality of service providers utilize different messaging formats;
format the first plurality of messages to a first format associated with a common service provider interface;
generate first outbound messages based at least in part on the first format;
receive a second plurality of messages from a plurality of mobile network operators, wherein at least two of the plurality of mobile network operators utilize different messaging formats;
format the second plurality of messages to a second format associated with a common mobile network operator interface;
generate second outbound messages based at least in part on the second format;
receive a third plurality of messages from a plurality of mobile devices, wherein at least two of the plurality of mobile devices utilize different messaging formats;
format the third plurality of messages to a third format associated at least with one device protocol associated with the plurality of mobile devices;
generate third outbound messages based at least in part on the third format;
transmit the first outbound messages to the plurality of service providers;
transmit the second outbound messages to the plurality of mobile network operators; and
transmit the third outbound messages to the plurality of mobile devices;
determine a secured key associated with a mobile device application;
receive a request to provision a mobile device application from a mobile device of the plurality of mobile devices;
install administration software on the mobile device based at least in part on the secured key; and
provision the requested mobile device application on the mobile device.

8. The system of claim 7, wherein the at least one processor is further configured to execute the computer-executable instructions to:
manage an application space on a secure element of the mobile device.

9. The system of claim 8, wherein the at least one processor is further configured to execute the computer-executable instructions to:
determine one or more privileges associated with the secure element of the mobile device.

10. The system of claim 8, wherein the secured key is used for at least one of personalizing of the mobile device application, managing a mobile device application lifecycle, providing administration functions to support relations between a mobile network operator and a service provider.

11. The system of claim 7, wherein the at least one processor is further configured to execute the computer-executable instructions to:
receive from at least one of the plurality of mobile network operators the secured key.

12. The system of claim 7, wherein the at least one processor is further configured to execute the computer-executable instructions to:
facilitate communication with at least one of the plurality of mobile devices using a carrier network operated by at least one of the mobile network operators.

13. A non-transitory computer-readable medium storing computer-executable instructions which, when executed by a processor, cause the processor to perform operations comprising:
receiving a first plurality of messages from a plurality of service providers, wherein at least two of the plurality of service providers utilize different messaging formats;
formatting the first plurality of messages to a first format associated with a common service provider interface;
generating first outbound messages based at least in part on the first format;
receiving a second plurality of messages from a plurality of mobile network operators, wherein at least two of the plurality of mobile network operators utilize different messaging formats;

formatting the second plurality of messages to a second format associated with a common mobile network operator interface;
generating second outbound messages based at least in part on the second format;
receiving a third plurality of messages from a plurality of mobile devices, wherein at least two of the plurality of mobile devices utilize different messaging formats;
formatting the third plurality of messages to a third format associated at least with one device protocol associated with the plurality of mobile devices;
generating third outbound messages based at least in part on the third format;
transmitting the first outbound messages to the plurality of service providers;
transmitting the second outbound messages to the plurality of mobile network operators;
transmitting the third outbound messages to the plurality of mobile devices;
determining a secured key associated with a mobile device application;
receiving a request to provision a mobile device application from a mobile device of the plurality of mobile devices;

installing administration software on the mobile device based at least in part on the secured key; and
provisioning the requested mobile device application on the mobile device.

14. The non-transitory computer-readable medium of claim 13, the operations further comprising:
managing an application space on a secure element of the mobile device.

15. The non-transitory computer-readable medium of claim 13, the operations further comprising:
receiving from at least one of the plurality of mobile network operators the secured key.

16. The non-transitory computer-readable medium of claim 13, wherein the secured key is used for at least one of personalizing of the mobile device application, managing a mobile device application lifecycle, providing administration functions to support relations between a mobile network operator and a service provider.

17. The non-transitory computer-readable medium of claim 13, the operations further comprising:
facilitating communication with at least one of the plurality of mobile devices using a carrier network operated by at least one of the mobile network operators.

* * * * *